April 5, 1927.  A. GOODGAME  1,623,870
FISHHOOK
Filed April 17, 1926
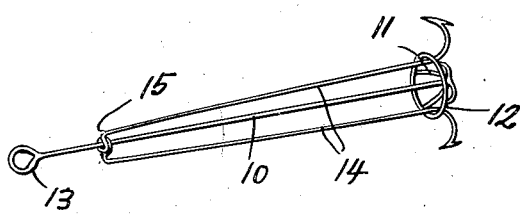
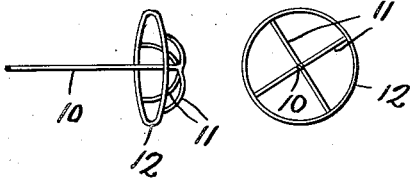
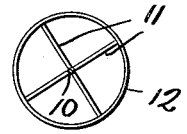
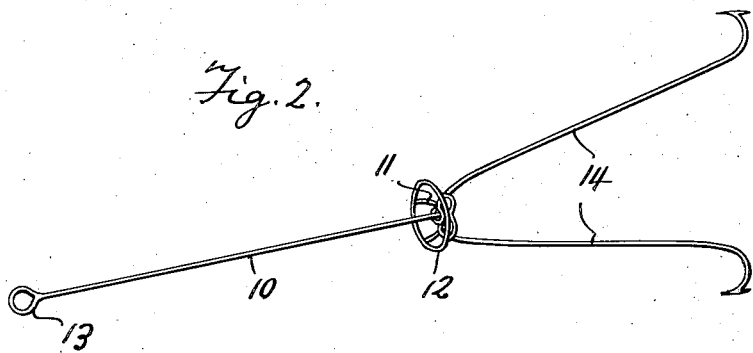
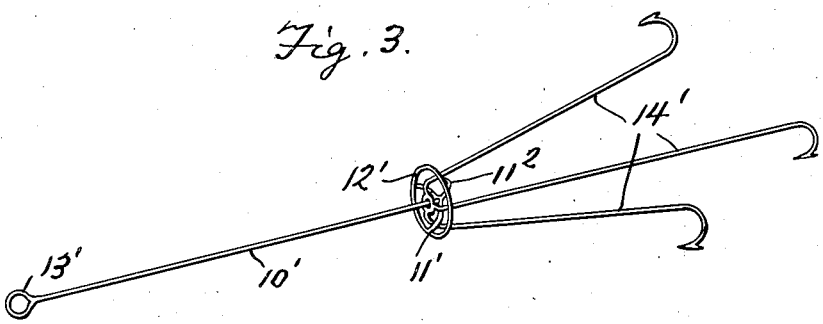
Allen Goodgame
INVENTOR
BY Victor J. Evans
ATTORNEY
WITNESS: Gerald Hennesy Patented Apr. 5, 1927.

1,623,870

UNITED STATES PATENT OFFICE.

ALLEN GOODGAME, OF REXFORD, MONTANA.

FISHHOOK.

Application filed April 17, 1926. Serial No. 102,757.

This invention relates to improvements in fish hooks, the general object being the provision of a dome shaped head provided upon one end of a shaft and having a fishing line attached thereto and such shaft having the upper ends of a plurality of fish hooks slidingly mounted thereon and adapted to be swung outwardly upon an upward movement of the shaft and dome shaped head.

With the above and other objects in view, the invention further includes the following novel features and details of construction, to be hereinafter more fully described, illustrated in the accompanying drawings and pointed out in the appended claim.

In the drawing:—

Figure 1 is a perspective of the invention.

Figure 2 is a similar view with the hooks extended.

Figure 3 is a similar view with respect to Figure 2 with a multiplicity of hooks used in conjunction therewith.

Figure 4 is a perspective of the dome shaped head.

Figure 5 is an elevation thereof.

Referring to the drawings in detail, wherein like characters of reference denote corresponding parts, the reference character 10 indicates a shaft having its lower and forward end secured to the inner sides and at the intersections of a pair of oppositely disposed semi-circular arms 11 which in turn have their opposite ends secured to the upper side of a ring 12. The opposite end of the shaft 10 is formed into an eye 13 within which one end of a fishing line, not shown, may be secured. A pair of fish hooks have their elongated shanks 14 provided with inwardly extending offset portions 15 upon their upper ends and hooped upon and around the shaft 10 and extending through the spaces defined between the corresponding inner sides of the arms 11, within the ring 12 and slidingly mounted upon the shaft 10.

In the use and operation of the present invention it is clearly apparent and manifest that the invention when used is normally positioned as clearly illustrated in Figure 1 of the drawing and when so cast will position the dome shaped head comprising the semicircular arms 11 and ring 12 downwardly adjacent the hooked ends of the shanks 14 and upon the apprehension of a nibble or jerk upon the bait, not shown, carried upon the hooked ends of the shanks 14 will pull upwardly upon the fishing line, not shown, and the shaft 10 which in turn will move upwardly within the looped ends 15 of the shanks 14 and simultaneously pull the dome shaped head thereafter which action causing the shanks 14 to be released from their tension against the inner sides of the rim whereby the said shanks will fly outwardly within the mouth of a fish.

In Figure 3 of the drawing I have illustrated a modified form of the invention constituting an identical shaft 10' having its lower end formed and secured at the inner sections of a semi-circular arm 11' and an arcuate shaped arm 11² and which in turn have their opposite ends secured to the lower side of a ring 12'. A multiplicity of like hooks having relatively long shanks 14' extending through the enclosures defined between the arms 11' and 11² respectively and secured and slidingly mounted upon the shaft 10' in the similar manner to those as indicated at 14 in the preferred form of the invention. The shaft 10' also includes an eye 13' within its opposite end for attachment to a fishing line or cord, not shown. It is manifest from the foregoing description and accompanying drawing that the offset portions formed upon the upper ends of the shanks 14 will tension the outer sides against the inner sides of the ring when positioned as clearly illustrated in Figure 1 of the drawing whereby the hooks may be baited and thrown over board and which may not be sprung in the positions as illustrated in Figures 2 and 3 of the drawing unless an upward pull is exercised upon the shank attached to the fishing line.

The invention is susceptible of various changes in its form, proportions and minor details of construction, and the right is herein reserved to make such changes as properly fall within the scope of the appended claim.

Having thus described the invention, what is claimed is:—

A fishing device comprising a shank, a ring, an arm semi-circular in configuration having the extremities thereof secured to the inner sides of the ring, an arcuate shaped arm carried by the ring and inter-secting the first mentioned arm at an intermediate point in its length in oppositely disposed relation with respect to the associated end of the shank, hooks having the shanks thereof disposed between said arms and within the ring, and offset loop portions formed upon the upper ends of the hook shanks around the first mentioned shank for sliding movement thereon.

In testimony whereof I affix my signature.

ALLEN GOODGAME.